3,265,764
MAR-RESISTANT UNSATURATED POLYESTER RESINS
William George Deichert, Flushing, N.Y., and Irene Christensen and Wallace Burton Ramsey, Stamford, Conn., assignors to American Cyanamid Company, Stamford, Conn., a corporation of Maine
No Drawing. Filed Sept. 21, 1964, Ser. No. 398,053
12 Claims. (Cl. 260—872)

This invention relates to a substantially linear, water-insoluble, non-gelled, unsaturated polyester resin composition which can be converted to the cross-linked state to produce a hard, mar-resistant object. Still further, this invention relates to an unsaturated polyester resin composition comprising (1) the esterification reaction product of fumaric acid, triethylene glycol and 2-ethyl-1,3-hexanediol, (2) certain glycol diacrylates and (3) a polymerizable styrene. Still further, this invention relates to articles of manufacture produced from the compositions of the present invention such as coating compositions, casting compositions and the films and cast objects resulting therefrom.

One of the objects of the present invention is to produce a substantially linear, water-insoluble, non-gelled, unsaturated polyester resin composition comprising (1) a polyester resin prepared from fumaric acid, triethylene glycol and 2-ethyl-1,3-hexanediol, (2) certain glycol diacrylates and (3) a polymerizable styrene. A further object of the present invention is to produce a resinous composition which may be used as a coating composition so as to impart to the substrate to which it is applied a hard, mar-resistant, surface with an improved measure of weather resistance. A further object of the present invention is to produce cast or molded articles from the composition of the present invention which have properties comparable to the films referred to hereinabove. These and other objects of the present invention will be discussed in greater detail hereinbelow.

The resinous composition of the present invention is comprised of three essential ingredients (1) an unsaturated polyester resin, (2) a major amount of a cross-linking agent, namely certain glycol diacrylates and (3) a minor amount of a cross-linking agent namely a polymerizable styrene.

The first component of the present invention is the esterification reaction product produced by reacting fumaric acid, triethylene glycol and 2-ethyl-1,3-hexanediol, wherein the esterification reaction is carried out until an acid number below about 30 is reached. The amount of hexanediol present in the final polyester resin may be varied between about 5% and 50% on a mole percent basis based on the total moles of the triethylene glycol and the hexanediol used to esterify the fumaric acid. Preferably one would use between about 20 and 35 mole percent of the hexanediol, same basis. It is conventional in the preparation of unsaturated polyester resins generally to use a slight excess of the polyhydric alcohol component in order to insure substantially complete esterification of the polycarboxylic acid, but the excess of the alcohol functionality after the reaction is complete, remains in the polyester resin as unreacted component. This slight excess is generally about 5 to 20% in excess of that amount stoichiometrically calculated to esterify substantially all of the carboxyl groups in the polycarboxylic acid. When this excess is calculated, it should be determined on the basis of each of the glycol and diol components rather than on the basis of either separately, so as not to upset the balance of the aforementioned diol content in the ultimate polyester resin.

The second component of the present invention namely, the glycol diacrylates, are prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis(4-hydroxybutyl)ether. Among the monoglycols which may be used to esterify the acrylic acids are ethylene glycol, propylene glycol, and the propanediols-1,2 and 1,3 and the butanediols-1,2; 1,3; and 1,4. These glycol diacrylates can be used with the glycol-hexanediol- fumarates either singly or in combination with one another. However, whether used singly or in combination, the glycol diacrylate should be present in the total composition in an amount varying between about 10% and 40% by weight based on the total weight of said glycol fumarate and said glycol diacrylate.

As has been indicated hereinabove, the third component in the composition of the present invention is a polymerizable styrene and is present in amounts varying between 1% and 5% by weight based on the total weight of the first, second and third components. Preferably, one would use about 3% by weight of said styrene, same basis. Among the polymerizable styrenes which may be used in the composition of the present invention are styrene per se, side chain and ring substituted halo and/or alkyl styrenes such as α-chlorostyrene, α-methylstyrene, o-, m-, p-methyl styrene, o-, m-, p-chlorostyrenes, 2,4-dimethylstyrene, 2,5-dimethylstyrene, 2,3-dichlorostyrene, 2,4-dibromostyrene, and the like. Since the presence of a halo substituent on a styrene compound may have a tendency to impart a slight yellowness to the ultimate cured object, these halo-substituted styrenes should be avoided particularly when the ultimately produced object will be used in an area where clarity and water whiteness is desired.

It has been pointed out hereinabove that the substantially linear, water-insoluble, non-gelled unsaturated polyester resin composition of the present invention can be converted to a hard mar-resistant product. This conversion from the ungelled or thermosetting state to the hard thermoset state can be accomplished by the application of heat and/or pressure with or without catalysis. Still further, the thermosetting material can be converted to the thermoset state by use of catalysts or initiators only, without resorting to either heat or pressure. The catalytic materials or polymerization initiators which would be used to make such a conversion in state are well known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used such as, the methyl ethyl ketone peroxide, the diethylketone peroxide and the like. The amounts of the catalytic material used will be conventional such as between about 0.01% and 3% by weight based on the weight of the polymerizable composition.

The polymerizable polyester resin compositions of the present invention will have utility in many areas such as in coatings, moldings, castings, and the like. One of the principal end uses for the polymerizable polyester resin compositions of the present invention is in the areas of coating substrates that have a transparent characteristic in order to impart to said substrate a hard, mar-resistant surface. More particularly, the polymerizable polyester resin compositions of the present invention can be used to coat glass for window purposes or for television implosion shields, and the like. Additionally, one can use the polymerizable compositions of the present invention to coat lenses as in eye glasses, including sunglasses, binoculars and telescopes and the like. Still further, these polymerizable compositions may be used to coat sheets of synthetic plastic materials such as sheets of polystyrene, polymethyl methacrylate, polycarbonates and the like. Still further, these polyester resin compositions can be used alone as a molding or casting composition to make such articles as eyeglass lenses and the like. If desired, the polyester resin compositions of the present invention may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic or phototropic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principal desired end use namely, transparency, certain dyes and/or pigments may be dissolved in the unsaturated polymerizable polyester resin in order to achieve a tinting. Furthermore, the polyester resin compositions of the present invention can be rendered translucent or even opaque by use of the appropriate selection of filler and/or pigment in the desired kind and amount especially when being used as a coating for substrates such as wood, metal and opaque, filled plastic articles.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer, inert gas inlet and outlet tubes, there is introduced 490 parts of 2-ethyl-1,3-hexanediol, 515 parts of triethylene glycol and 797 parts of fumaric acid. The charge is heated to about 150–200° C. for a 28 hour period while bubbling carbon dioxide gas through the reaction mixture so as to provide an inert atmosphere blanket. At the end of the reaction period, the product, having an acid number of 28, is a light yellow, viscous liquid. Eighty parts of the polyester resin thus produced is blended with 20 parts of ethylene glycol dimethacrylate, 3 parts of styrene and 2 parts of benzoyl peroxide. The solution is poured onto a sheet of plate glass to form a film onto which film is placed a sheet of polymethyl methacrylate. The sheet is placed carefully over the resin solution so as to avoid getting bubbles between the plastic sheet and glass. Thereafter a second sheet of plate glass is placed over the plastic sheet and the total assembly is clamped together so as to squeeze out excess resin and assure that there will be no warping or other distortion during the curing of the resin. The assembly is then heated for one-half hour at 80° C., one-half hour at 100° C., one hour at 120° C. and one-half hour at 130° C. The assembly is cooled to room temperature, the clamps removed and the glass sheets separated from the plastic sheet. The coated sheet, after the flash removal has a haze value of 3%. The polyester surface is tested with a Deichert-Webb mar tester and has a mar-resistance value of 3. (Deichert-Webb mar tester is fully disclosed and claimed in the U.S. patent application Serial No. 390,037, filed August 17, 1964.) The polyester resin surface has a Barcol hardness of 48 and withstands weathering in a fluorescent-ultraviolet-weathering machine for 1700 hours before the first signs of deterioration by weathering are observed. A substantially identical casting, but devoid of the hexanediol only endured 200 hours in the same weathering machine before the first signs of weather deterioration were observed.

*Example 2*

Into a suitable reaction vessel equipped as in Example 1, there is introduced 6044 parts of triethylene glycol, 5885 parts of 2-ethyl-1,3-hexanediol and 9071 parts of fumaric acid. The charge is heated at around 190° C. for a 24 hour period while bubbling nitrogen gas through the reaction mixture so as to provide an inert atmosphere blanket. The product produced has an acid number of 23 and is a light yellow viscous liquid. A solution containing 320 parts of the polyester resin, 80 parts of ethylene glycol dimethacrylate, 12 parts of styrene and 8 parts of benzoyl peroxide is prepared and poured into a casting cell in order to make a ⅛″ thick sheet. After sealing the cell the system is heated for one-half hour at 80° C., one-half hour at 100° C., one hour at 120° C. and one-half hour at 130° C. Upon cooling the cast sheet is removed from the cell and tested. The sheet had a Deichert-Webb mar-resistance value of 3, a Barcol hardness of 48 and a F.U.W. stability of 1700 hours.

*Example 3*

A solution containing 320 parts of the polyester resin of Example 2 is blended with 80 parts of polyethylene glycol dimethacrylate, 12 parts of styrene and 8 parts of benzoyl peroxide. After thorough mixing of the components, the solution is poured into a casting cell as in Example 2 and subjected to the same curing cycle. The resulting cast sheet had a Deichert-Webb mar-resistance value of 3, a Barcol hardness of 31 and a F.U.W. stability of 800 hours.

*Example 4*

Into a suitable reaction vessel equipped as in Example 1 there is introduced 619 parts of triethylene glycol, 206 parts of 2-ethyl-1,3-hexanediol and 580 parts of fumaric acid. The charge is heated as before to produce a light yellow viscous liquid having an acid value of 24. A solution containing 320 parts of the above polyester resin, 80 parts of polyethylene glycol dimethacrylate, 12 parts of styrene and 8 parts of benzoyl peroxide is prepared and poured into a casting cell as in Example 2. The system was subjected to the same cure cycle as in Example 2. The ultimate cast sheet was tested as before and showed a Deichert-Webb mar-resistance value of 2, a Barcol hardness of 27 and a F.U.W. stability of 600 hours.

*Example 5*

Into a suitable reaction vessel equipped as in Example 1 there is introduced 842 parts of triethylene glycol, 144 parts of 2-ethyl-1,3-hexanediol and 696 parts of fumaric acid. The charge was heated as in Example 1 but at 150° C. for 50 hours while bubbling nitrogen gas through the reaction mixture to provide an inert atmosphere. The ultimate product is a light yellow viscous liquid having an acid number of 18. A solution containing 320 parts of the above resin, 80 parts of ethylene glycol dimethacrylate, 12 parts of styrene and 8 parts of benzoyl peroxide is prepared and added to a casting cell as in Example 2. The cell and contents are heated for 16 hours at 70° C. followed by 4 hours at 115° C. Upon cooling the cast sheet is removed from the cell and tested for physical properties. The sheet had a Deichert-Webb mar-resistance value of 2, a Barcol hardness of 44 and a F.U.W. stability of 500 hours.

*Example 6*

Into a suitable reaction vessel equipped as in Example 1 there is introduced 748 parts of triethylene glycol, 41 parts of 2-ethyl-1,3-hexanediol and 580 parts of fumaric acid. The reaction conditions of Example 2 were followed to produce a light yellow viscous liquid with an acid value of 21. A solution is prepared containing 320 parts of the above resin, 80 parts of ethylene glycol dimethacrylate, 12 parts of styrene and 8 parts of benzoyl peroxide. The solution is poured into a casting cell as in Example 2 and upon sealing, the cell assembly including contents, is subjected to heating for 16 hours at 70° C. followed by 4 hours at 115° C. Upon cooling, the cast sheet is removed from the cell and tested for physical properties. The sheet had a Diechert-Webb mar-resistance value of 2, a Barcol hardness of 41 and a F.U.W. stability of 300 hours.

The Deichert-Webb mar tester used to determine abrasion resistance is an instrument comprising a hollow cylindrical housing having a piston activated by a tension spring onto the base of which piston is mounted a disc of abrasive paper. The instrument is used by pressing the spring activated piston against the surface to be tested with a fixed amount of pressure. Thereupon the piston and disc are rotated manually through one complete revolution. The rotation is usually accomplished in about 3 to 5 seconds. The surface of the object being tested is then observed and the number of rings which can be seen with the unaided eye under approximately optimum observing conditions is a measure of sensitivity to marring. The samples are examined by placing them slightly off the line from a strong light source and about 10" from the eye. A small angle scattering of the pattern is observed.

We claim:

1. A substantially linear, water-insoluble, non-gelled, unsaturated polyester resin composition comprising a blend of (1) the esterification reaction product of reactants consisting essentially of fumaric acid, triethylene glycol and 2-ethyl-1,3-hexanediol, wherein said product has an acid number below about 30, (2) a glycol diacrylate which is the reaction product of glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

2. A substantially linear, water-insoluble, non-gelled, unsaturated polyester resin composition comprising a blend of (1) the esterification reaction product of reactants consisting essentially of fumaric acid, triethylene glycol and 2-ethyl-1,3-hexanediol wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the reaction product, wherein (2) is present in an amount varying between about 10% and 40% by weight based on the total weight of (1) and (2), and (3) styrene in an amount varying between about 1% and 5% by weight based on the total weight of (1), (2) and (3).

3. A substantially linear, water-insoluble, non-gelled, unsaturated polyester resin composition comprising a blend of (1) the esterification reaction product of reactants consisting essentially of fumaric acid, triethylene glycol and 2-ethyl-1,3-hexanediol, wherein said product has an acid number below about 30, (2) ethylene glycol dimethacrylate, wherein said hexanediol is present in (1) in an amount varying between 5 and 50 mol percent based on the total mols of the dihydric alcohols in the reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

4. A substantially linear, water-insoluble, non-gelled, unsaturated polyester resin composition comprising a blend of (1) the esterification reaction product of reactants consisting essentially of fumaric acid, triethylene glycol and 2-ethyl-1,3-hexanediol, wherein said product has an acid number below about 30, (2) ethylene glycol dimethacrylate, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) styrene in an amount varying between about 1% and 5% by weight based on the total weight of (1), (2) and (3).

5. A hard, mar-resistant, cross-linked unsaturated polyester resin composition comprising the cured reaction product of (1) the esterification reaction product of reactants consisting essentially of fumaric acid, triethylene glycol and 2-ethyl-1,3-hexanediol, wherein said product has an acid number below about 30, (2) a glycol diacrylate which is the reaction product of glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

6. A hard, mar-resistant, cross-linked, unsaturated polyester resin composition comprising the cured reaction product of (1) the esterification reaction product of reactants consisting essentially of fumaric acid, triethylene glycol and 2-ethyl-1,3-hexanediol, wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) styrene in an amount varying between about 1% and 5% by weight based on the total weight of (1), (2) and (3).

7. A hard, mar-resistant, cross-linked unsaturated, polyester resin composition comprising the cured reaction product of (1) the esterification reaction product of reactants consisting essentially of furmaric acid, triethylene glycol and 2-ethyl-1,3-hexanediol, wherein said product has an acid number below about 30, (2) ethylene glycol dimethacrylate, wherein said hexanediol is present in (1) in an amount varying betwen 5 and 50 mol percent based on the total mols of the dihydric alcohols in the esterification reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

8. A hard, mar-resistant, cross-linked unsaturated, polyester resin composition comprising the cured reaction product of (1) the esterification reaction product of reactants consisting essentially of fumaric acid, triethylene glycol and 2-ethyl-1,3-hexanediol, wherein said product has an acid number below about 30, (2) ethylene glycol dimethacrylate, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) styrene in an amount varying between about 1% and 5% by weight based on the total weight of (1), (2) and (3).

9. A sheet of polymethyl methacrylate having bonded to the surface thereof a hard, mar-resistant, cross-linked, unsaturated polyester resin composition comprising the cured reaction product of (1) the esterification reaction product of reactants consisting essentially of fumaric acid, triethylene glyocl and 2-ethyl-1,3-hexanediol, wheresaid product has an acid number below about 30, (2) a glycol diacrylate which is the reaction product of glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

10. A sheet of polymethyl methacrylate having bonded to the surface thereof a hard, mar-resistant, cross-linked, unsaturated polyester resin composition comprising the cured reaction product of (1) the esterification reaction product of reactants consisting essentially of fumaric acid, triethylene glyocl and 2-ethyl-1,3-hexanediol, wherein said product has an acid number below about 30, (2) a glycol diacrylate which is the reaction product of glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) styrene in an amount varying between about 1% and 5% by weight based on the total weight of (1), (2) and (3).

11. A sheet of polymethyl methacrylate having bonded to the surface thereof a hard, mar-resistant, cross-linked, unsaturated polyester resin composition comprising the cured reaction product of (1) the esterification reaction product of reactants consisting essentially of fumaric acid, triethylene glyocl and 2-ethyl-1,3-hexanediol, wherein said product has an acid number below about 30, (2) ethylene glycol dimethacrylate, wherein said hexanediol is present in (1) in an amount varying between 5 and 50 mol percent based on the total mols of the dihydric alcohols in the esterification reaction product, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

12. A sheet of polymethyl methacrylate having bonded to the surface thereof a hard, mar-resistant, cross-linked, unsaturated polyester resin composition comprising the cured reaction product of (1) the esterification reaction product of reactants consisting essentially of fumaric acid, triethylene glyocl and 2-ethyl-1,3-hexanediol, wherein said product has an acid number below about 30, (2) ethylene glycol dimethacrylate, wherein said hexanediol is present in (1) an amount varying between 5 and 50 mol percent based on the total mols of the dihydric alcohols in the esterification reaction product, wherein (2) is present in an amount varying between about 10% and 40% by weight based on the total weight of (1) and (2) and (3) styrene in an amount varying between about 1% and 5% by weight based on the total weight of (1), (2) and (3).

References Cited by the Examiner

UNITED STATES PATENTS

| | | | |
|---|---|---|---|
| 2,521,575 | 9/1960 | Fisk | 260—872 |
| 2,645,626 | 7/1963 | Nordlander et al. | 260—866 |
| 3,222,421 | 12/1965 | Lundberg | 260—872 |

MURRAY TILLMAN, *Primary Examiner.*

J. T. GOOLKASIAN, *Assistant Examiner.*